(12) United States Patent
Stellari et al.

(10) Patent No.: US 11,879,932 B2
(45) Date of Patent: Jan. 23, 2024

(54) DETECTION OF AN AGED CIRCUIT

(71) Applicant: International Business Machines Corporation, Armonk, NY (US)

(72) Inventors: Franco Stellari, Waldwick, NJ (US); Peilin Song, Lagrangeville, NY (US); Naigang Wang, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 807 days.

(21) Appl. No.: 16/169,699

(22) Filed: Oct. 24, 2018

(65) Prior Publication Data
US 2020/0132751 A1 Apr. 30, 2020

(51) Int. Cl.
*G01R 31/28* (2006.01)
*G06F 21/73* (2013.01)
*G06F 11/263* (2006.01)

(52) U.S. Cl.
CPC ..... *G01R 31/2834* (2013.01); *G01R 31/2872* (2013.01); *G06F 11/263* (2013.01); *G06F 21/73* (2013.01)

(58) Field of Classification Search
CPC ............ G01R 31/2834; G01R 31/2872; G01R 31/3008; G01R 31/2879; G06F 21/73; G06F 11/263
See application file for complete search history.

(56) References Cited

U.S. PATENT DOCUMENTS

| 3,325,723 A | * | 6/1967 | Grayson | .................. B64G 7/00 323/229 |
| 4,698,740 A | * | 10/1987 | Rodgers | .............. H02M 3/1563 363/89 |
| 9,885,745 B2 | | 2/2018 | Hamilton | |
| 9,887,721 B2 | | 2/2018 | Martin et al. | |
| 9,959,430 B2 | | 2/2018 | Keller, III et al. | |
| 9,897,560 B2 | | 5/2018 | Hamilton et al. | |

(Continued)

FOREIGN PATENT DOCUMENTS

JP H07231409 * 8/1995 ............... H04N 5/44

OTHER PUBLICATIONS

"Evaluating the Effects of Aging on Electronic Instrument and Control Boards and Components in Nuclear Plants", Final Report, May 2005, U.S. Department of Energy, Washington, DC, 110 pages.*

(Continued)

*Primary Examiner* — Alexander Satanovsky
(74) *Attorney, Agent, or Firm* — Amin, Turocy & Watson, LLP

(57) ABSTRACT

Techniques regarding autonomous identification of aged circuits are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise an identification component, operatively coupled to the processor, that can identify an aged circuit by analyzing a current-voltage characteristic curve for a distortion in a sub-threshold quiescent current signature of the aged circuit.

20 Claims, 12 Drawing Sheets

(56) References Cited

U.S. PATENT DOCUMENTS

2016/0372389 A1* 12/2016 Brochu, Jr. ............ G01R 31/44
2018/0292879 A1* 10/2018 Cher ................. G01R 19/0092

OTHER PUBLICATIONS

"Integrity and Reliability of Integrated Circuits (IRIS),"Defense Advanced Research Projects Agency. Last Accessed Sep. 14, 2018. https://www.darpa.mil/program/integrity-and-reliability-of-integrated-circuits. 2 pages.
Agrawal, Dakshi, et al. "Trojan Detection using IC Fingerprinting." 2007 IEEE Symposium on Security and Privacy (SP'07). 15 pages.
Rad, Reza, et al. "A Sensitivity Analysis of Power Signal Methods for Detecting Hardware Trojans under Real Process and Environmental Conditions." IEEE Transactions on Very Large Scale Integration (VLSI) Systems • Jan. 2011. 11 pages.
Narasimhan, Seetharam, et al. "Multiple-Parameter Side-Channel Analysis: A Non-Invasive Hardware Trojan Detection Approach." 2010 IEEE International Symposium on Hardware-Oriented Security and Trust (HOST). 6 pages.
Jin, Yier, et al. "Hardware Trojan Detection Using Path Delay Fingerprint." 2008 IEEE International Workshop on Hardware-Oriented Security and Trust. 7 pages.
"High Performance Microchip Supply." Office of the Under Secretary of Defense for Acquisition, Technology, and Logistics. Feb. 2005. 118 pages.
Wang, Xiaoxiao, et al. "Detecting Malicious Inclusions in Secure Hardware: Challenges and Solutions." 2008 IEEE International Workshop on Hardware-Oriented Security and Trust. 8 pages.
Song, Peilin, et al. "MARVEL—Malicious Alteration Recognition and Verification by Emission of Light " 2011 IEEE International Symposium on Hardware-Oriented Security and Trust. 5 pages.
Stellari, Franco, et al. "Testing and Diagnostics of CMOS Circuits Using Light Emission from Off-State Leakage Current." IEEE Transactions on Electron Devices, vol. 51, No. 9, Sep. 2004 1455. 8 pages.
Stellari, Franco, et al. "Novel IC Sub-Threshold IDDQ Signature and Its Relationship to Aging During High Voltage Stress." European Solid-State Device Research Conference 2018. 4 pages.
Guin, Ujjwal, et al. "Counterfeit Integrated Circuits: Detection, Avoidance, and the Challenges Ahead." Journal of Electronic Testing: Theory and Applications, vol. 30, Issue 1, pp. 19-23. Feb. 2014. 15 pages.
Hewett, Harold. Methods Used in the Detection of Counterfeit Electronic Components. SMTA International Conference Proceedings, 2015. 11 pages.
Zheng, Yu, et al. "SeMIA: Self-Similarity-Based IC Integrity Analysis." IEEE Transactions on Computer-Aided Design of Integrated Circuits and Systems, vol. 35, No. 1, Jan. 2016. 12 pages.
Mell, Peter, et al. "The NIST Definition of Cloud Computing." National Institute of Standards and Technology. Sep. 2011. 7 pages.

* cited by examiner

1

DETECTION OF AN AGED CIRCUIT

STATEMENT REGARDING FEDERALLY SPONSORED RESEARCH OR DEVELOPMENT

This invention was made with Government support under Contract No.: HR0011-16-C-0040 awarded by Defense Advanced Research Projects Agency (DARPA). The Government has certain rights in this invention.

BACKGROUND

The subject disclosure relates to the detection of an aged circuit, and more specifically, to the autonomous identification of an aged circuit based on one or more distortions in a sub-threshold quiescent current signature of the circuit.

Modern globalization trends have pushed more companies to use a fabless model to reduce overall integrated circuit ("IC") costs, wherein fabrication of one or more devices can be conducted by a separate manufacturer. Since the fabless model introduces potential hardware security vulnerabilities, new detection methods aimed to improve IC security are being developed. In particular, the detection of aged circuits (e.g., old circuits, refurbished circuits, and/or reused circuits) has become increasing important. Some conventional techniques focus on power supply activities and/or signal path delay to detect aged circuits. Although these methods can be effective in some cases, they often suffer in detection accuracy when design alterations involve small circuits embedded into large chips. These "inserted" circuits cannot be easily detected through regular electrical screen tests because they are designed to hide themselves.

Many companies conduct destructive reverse engineering of ICs as a common practice to discover the implementation of a particular device at the transistor and metal levels. These techniques often involve destroying the device by delayering it and analyzing it using scanning electron microscope inspections, transmission electron microscopy cross sections, a combination thereof, and/or the like. However, reverse engineering techniques can be very time consuming (e.g., and therefore they can be applied only to a small batch of fabricated chips) and/or destructive (e.g., limiting the inspection to samples that exclude the actual chip that will be used for real applications).

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate identifying one or more aged circuits are described.

According to an embodiment, a system is provided. The system can comprise a memory that can store computer executable components. The system can also comprise a processor, operably coupled to the memory, that can execute the computer executable components stored in the memory. The computer executable components can comprise an identification component, operatively coupled to the processor, that can identify an aged circuit by analyzing a current-voltage characteristic curve for a distortion in a sub-threshold quiescent current signature of the aged circuit. An advantage of such a system can be the detection of aged circuits that are old, refurbished, and/or reused.

In some examples, the computer executable components can also comprise a derivative component, operatively coupled to the processor, that can generate a derivative of the current-voltage characteristic curve. Further, the computer executable components can comprise an analysis component, operatively coupled to the processor, that can analyze a region of the derivative current-voltage characteristic curve corresponding to the sub-threshold quiescent current signature of the aged circuit. An advantage of such a system can be that a change in one or more threshold parameters can customize the aged circuit identification process to meet specific goals.

According to an embodiment, a computer-implemented method is provided. The computer-implemented method can comprise identifying, by a system operatively coupled to a processor, an aged circuit by analyzing a current-voltage characteristic curve for a distortion in a sub-threshold quiescent current signature of the aged circuit. An advantage of such a method can be that an aged circuit can be identified without destructive inspections methods.

In some examples, the analyzing can be directed to a region of the current-voltage characteristic curve corresponding to the sub-threshold quiescent current signature of the aged circuit. Additionally, the computer-implemented method can comprise comparing, by the system, the region of the current-voltage characteristic curve with a reference current-voltage characteristic curve to determine whether the sub-threshold quiescent current signature comprises the distortion. An advantage of such a method can be the detection of aged circuits integrated within larger circuit chips.

According to an embodiment, a computer program product for identifying an aged circuit is provided. The computer program product can comprise comprising a computer readable storage medium having program instructions embodied therewith. The program instructions can be executable by a processor to cause the processor to identify, by a system operatively coupled to the processor, the aged circuit by analyzing a derivative of a current-voltage characteristic curve for a distortion in a sub-threshold quiescent current signature of the aged circuit. An advantage of such a computer program product can be that the identification of an aged circuit can be readily performed without detailed knowledge of the circuit's operation.

In some examples, the program instructions can cause the processor to compare, by the system, a region of the derivative of the current-voltage characteristic curve corresponding to the sub-threshold quiescent current signature with a defined threshold. An advantage of such a computer program product can be the detection of circuit aging that can be induced, for example, by one or more accelerated voltage stress conditions.

DETAILED DESCRIPTION

Figure 1:
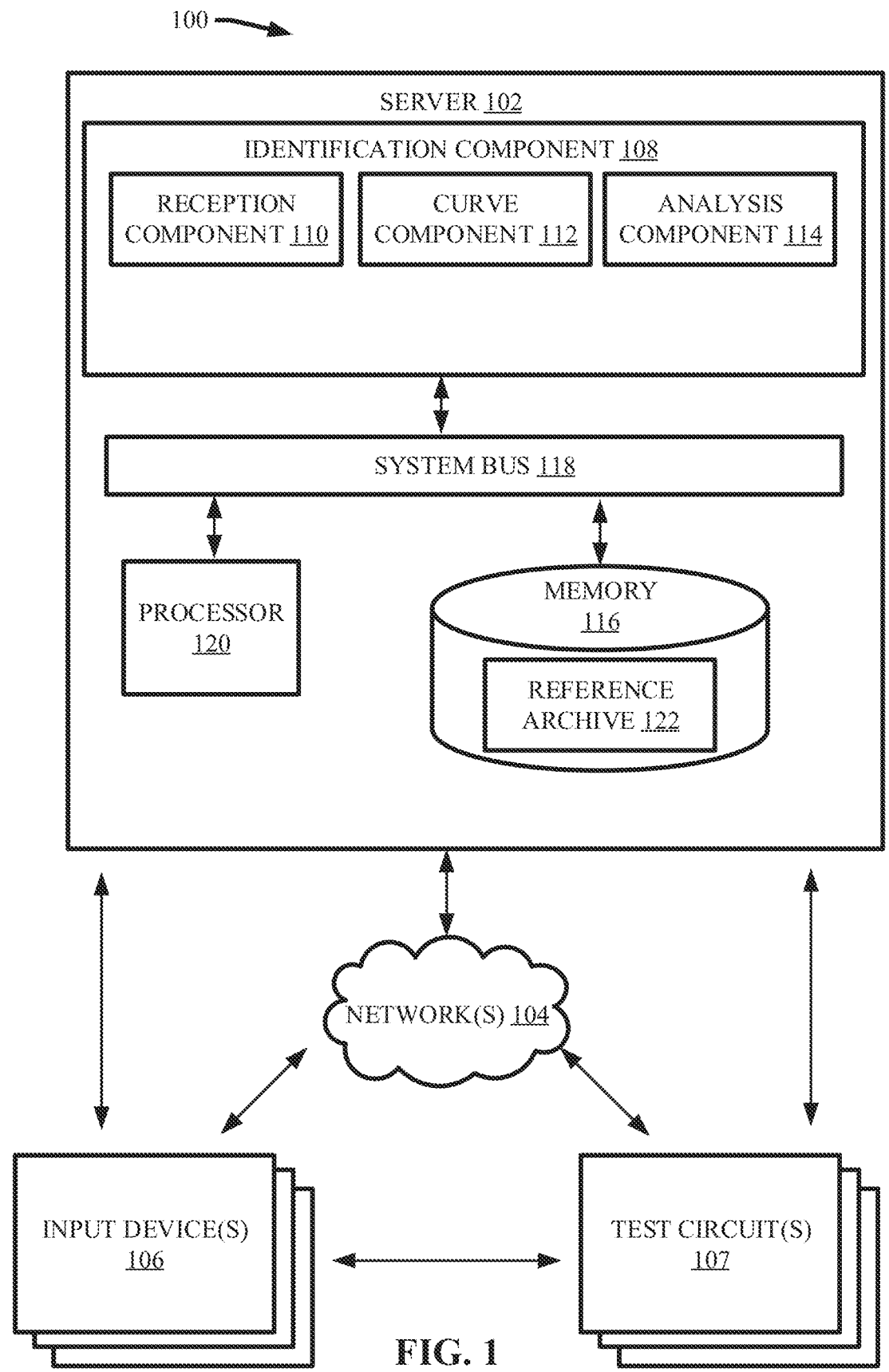
FIG. 1 illustrates a block diagram of an example, non-limiting system that can identify one or more aged circuits based on a sub-threshold quiescent current signature in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the above problems with conventional age detection techniques with regards to circuits (e.g., ICs), the present disclosure can be implemented to produce a solution to one or more of these problems in the form of an autonomous detection method based on an analysis of the subject circuit's sub-threshold quiescent current signature. Advantageously, the one or more methods of detection technologies described herein can identify one or more aged circuits without destructive reverse engineering processes. Further, by analyzing the sub-threshold quiescent current signature of the circuit, identification of an aged circuit can be readily performed without detailed knowledge of the circuit's operation.

Various embodiments of the present invention can be directed to computer processing systems, computer-implemented methods, apparatus and/or computer program products that facilitate the efficient, effective, and autonomous (e.g., without direct human guidance) identification of one or more aged circuits. For example, one or more embodiments described herein can comprise analyzing a current-voltage characteristic curve ("I-V curve") at various sub-threshold voltages for a subject circuit. For instance, a region of the I-V curve corresponding to the sub-threshold quiescent current ("IDDQ") signature of the circuit can be compared to a reference I-V curve. Aged circuits can exhibit distorted sub-threshold IDDQ signatures, which can be apparent in the measured I-V curve when compared to the reference I-V curve. In another example, one or more embodiments described herein can comprise analyzing a derivative (e.g., a first order derivative) of the I-V curve at various sub-threshold voltages for a subject circuit. For instance, a region of the derivative of the I-V curve corresponding to the sub-threshold IDDQ signature of the circuit can be analyzed for one or more peaks having amplitudes and/or positions outside a defined threshold. Aged circuits can exhibit distorted sub-threshold IDDQ signatures, which can be apparent in the derivative of the measured I-V curve as exaggerated features (e.g., peaks with exaggerated amplitudes).

The computer processing systems, computer-implemented methods, apparatus and/or computer program products employ hardware and/or software to solve problems that are highly technical in nature (e.g., identification of one or more aged circuits), that are not abstract and cannot be performed as a set of mental acts by a human. For example, an individual, or a plurality of individuals, cannot generate I-V curves and/or derivative I-V curves with the speed and efficiency of the various embodiments described herein. Nor can a human analyze I-V curves and/or derivative I-V curves with the speed and efficiency of the various embodiments described herein. For example, one or more of the embodiments described herein can be utilized to test large batches of circuits to identify aged circuits, and thereby can regard a vast amount of data related to the various circuits. A human cannot process and/or analyze the vast amount of data characterizing a batch of circuits in a fashion that would facilitate large scale quality control.

As used herein, the term "aged circuit" can refer to a circuit that has been aged, previously utilized, and/or refurbished. For example, an aged circuit can be a circuit aged by one or more various forms of stress, including, but not limited to: ramp voltage stress, constant voltage stress, elevated temperature stress, high humidity stress, a combination thereof, and/or the like. For instance, stress induced aging can be caused by uniform and/or non-uniform degradation of the subject circuit. Additionally, the degradation may take place while the circuit is being operated (performing functional operations) or left in a quiescent state. As used herein, the term "alternating current ("AC")-type" can refer to a stress (e.g., ramp voltage stress and/or constant voltage stress) performed with the circuit being operated with an appropriate functional exerciser. As used herein, the term "direct current ("DC")-type" can refer to a stress (e.g., ramp voltage stress and/or constant voltage stress) performed with the circuit not operating or in a quiescent state.

FIG. 1 illustrates a block diagram of an example, non-limiting system 100 that can autonomously identify one or more aged circuits. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, one or more input devices 106, and/or one or more test circuit(s) 107. The server 102 can comprise identification component 108. The identification component 108 can further comprise reception component 110, curve component 112, and/or analysis component 114. Also, the server 102 can comprise or otherwise be associated with at least one memory 116. The server 102 can further comprise a system bus 118 that can couple to various components such as, but not limited to, the identification component 108 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments via the one or more networks 104.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106, and/or the one or more test circuits 107 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the identification component 108 can be provided on the one or more servers 102, it should be appreciated that the architecture of system 100 is not so limited. For example, the identification component 108, or one or more components of identification component 108, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. A user of the system 100 can utilize the one or more input devices 106 to input data into the system 100, thereby sharing (e.g., via a direct connection and/or via the one or more networks 104) said data with the server 102. For example, the one or more input devices 106 can send data to the reception component 110 (e.g., via a direct connection and/or via the one or more networks 104).

Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In one or more embodiments, a user of the system 100 can utilize the one or more input devices 106 to enter into the system 100 data regarding one or more test circuits 107. The one or more test circuits 107 can comprise one or more circuits (e.g., integrated circuits) that are subject to testing by the identification component 108. The testing performed by the identification component 108 on the one or more test circuits 107 can comprise identifying whether a subject test circuit 107 is an aged circuit. In some embodiments, a user of the system 100 can utilize the one or more input devices 106 to input one or more performance data regarding the one or more test circuits 107 that can be used by the identification component 108 to generate one or more I-V curves. In various embodiments, a user of the system 100 can utilize the one or more input devices 106 to input one or more I-V curve data regarding one or more test circuits 107 for analysis by the identification component 108. Data (e.g., performance data and/or I-V curve data) inputted into the system 100 by the one or more input devices 106 can be shared with the one or more servers 102 directly (e.g., via an electrical connection) and/or indirectly (e.g., via the one or more networks 104).

In one or more embodiment, the one or more test circuits 107 can send performance data to the one or more servers 102. For example, performance data sent by the one or more test circuits 107 can comprise information that can be utilized by the identification component 108 to generate one or more I-V curves characterizing an operation of the one or more test circuits 107. Data (e.g., performance data) generated by the one or more test circuits 107 can be shared with the one or more servers 102 directly (e.g., via an electrical connection) and/or indirectly (e.g., via the one or more networks 104).

The reception component 110 can be operably coupled to the one or more input devices 106 and/or test circuits 107 directly or indirectly (e.g., via the one or more networks 104) and can receive data for analyzation by one or more components of the identification component 108. For example, the reception component 110 can be operably coupled to the curve component 112 and can facilitate transference of performance data to the curve component 112 to facilitate generation of an I-V curve. In another example, the reception component 110 can be operably coupled to the analysis component 114 to facilitate transference of I-V curve data to the analysis component 114 to facilitate analysis of one or more I-V curves that characterize a sub-threshold IDDQ signature of one or more test circuits 107.

In one or more embodiments, the curve component 112 can generate one or more I-V curves depicting the sub-threshold IDDQ signature of one or more test circuits 107. For example, the one or more I-V curves generated by the curve component 112 can regard the sub-threshold current and/or sub-threshold voltage of a subject test circuit 107. The curve component 112, can generate the one or more I-V curves based on performance data inputted by the one or more input devices 106 and/or generated by the one or more test circuits 107.

Figure 2:
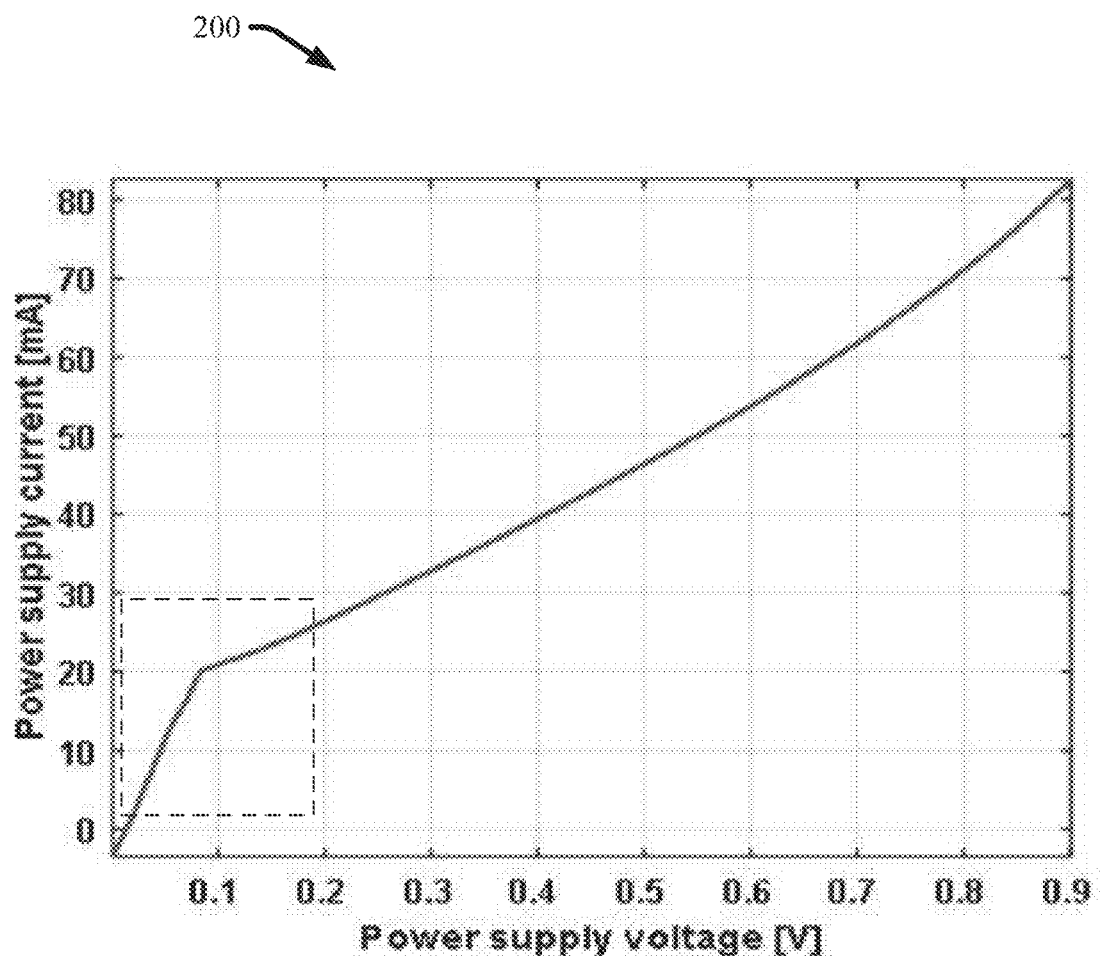
FIG. 2 illustrates a diagram of an example, non-liming current-voltage characteristic curve of a sub-threshold quiescent current signature in accordance with one or more embodiments described herein.

FIG. 2 illustrates a diagram of a non-limiting, exemplary I-V curve 200 that can be generated by the curve component 112 in accordance with one or more embodiments described herein. Repetitive description of like elements employed in other embodiments described herein is omitted for sake of brevity.

The exemplary I-V curve 200 depicted in FIG. 2 can depict the sub-threshold IDDQ signature of a test circuit 107 that has not been subject to aging (e.g., aging induced by stress to the test circuit 107). The I-V curve of an unaged circuit can comprise two main slopes connected by a smooth transition knee. For example, as shown in FIG. 2, the exemplary I-V curve 200 can comprise a first main slope connected to a second main slope by a smooth transition knee at a sub-threshold voltage of about 100 millivolts (mV).

In various embodiments, the analysis component 114 can analyze the one or more I-V curves to facilitate identifying whether a subject test circuit 107 is aged. The analysis component 114 can acquire the one or more I-V curves from the curve component 112 and/or from the one or more input devices 106. In one or more embodiments, the analysis component 114 can analyze a region of the subject I-V curve that comprises the transition knee, such as the region delineated in FIG. 2 with dashed lines.

The analysis component 114 can compare the one or more I-V curves with one or more reference I-V curves. Differences between the one or more I-V curves and the one or more reference I-V curves can be caused by one or more distortions of the subject test circuit's 107 sub-threshold IDDQ signature, wherein the one or more distortions can be indicative of aging. In one or more embodiments, the one or more reference I-V curves can be entered into the system 100 via the one or more input devices 106 and/or can be stored in a reference archive 122 (e.g., located in the memory as shown in FIG. 1). For example, the analysis component 114 can retrieve one or more reference I-V curves from the reference archive 122 to facilitate one or more comparisons.

The analysis component 114 can compare the one or more I-V curves with the one or more reference I-V curves to make one or more of the following determinations to analyze for one or more distortions in the sub-threshold IDDQ signature: determining the amplitude of the current depicted in the I-V curve and comparing it against the amplitude of the current depicted in the reference I-V curve; determining the presence of a transition knee or peak in the I-V curve and comparing it against a reference transition knee in the reference I-V curve; determining the voltage position corresponding to a transition knee and/or peak in the I-V curve and comparing the voltage position against a reference voltage position corresponding to a reference transition knee and/or peak in the reference I-V curve; determining the shape of a transition knee and/or peak in the I-V curve and comparing it against the shape of the reference I-V curve; determining the rate of increase of the I-V curve in respect to the applied voltage; a combination thereof, and/or the like. For example, one or more distortions in the sub-threshold IDDQ signature can be depicted in the I-V curve by one or more of the following indicators, including, but not limited to: the presence of a peak in the sub-threshold current measurement of the I-V curve instead of a smooth transition knee, the presence of a peak at a higher voltage measurement in the I-V curve than in the reference I-V curve, the formation of multiple peaks in the sub-threshold current measurement of the I-V curve, a lower rate of increase of current at voltages below the transition knee in the I-V curve than a reference rate of the reference I-V curve, a combination thereof, and/or the like.

Figure 3A:
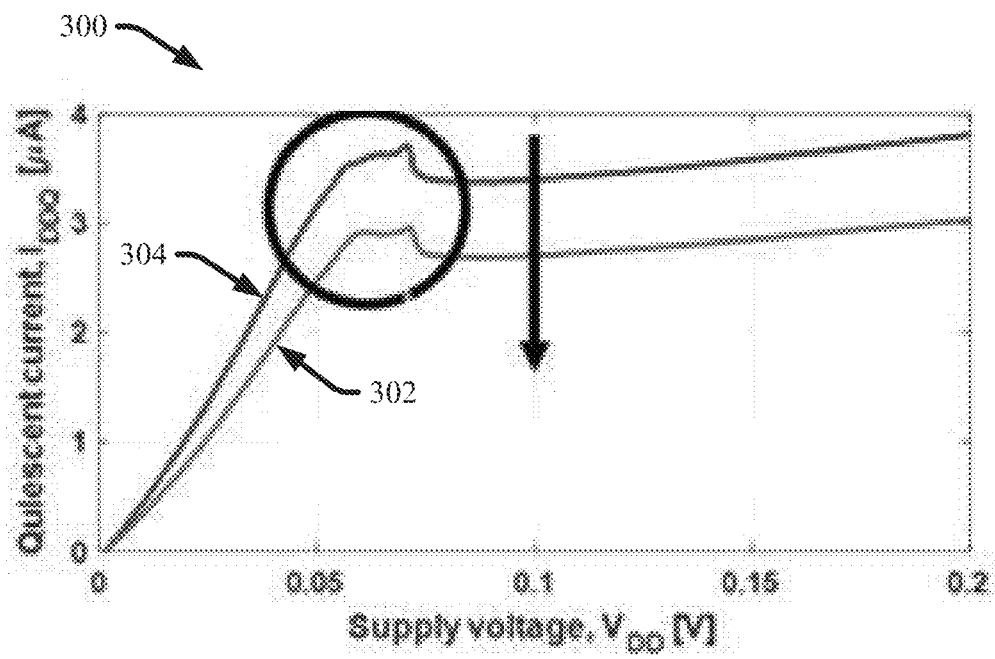
FIG. 3A illustrates a diagram of an example, non-limiting comparison of a measured current-voltage characteristic curve and a reference current-voltage characteristic curve, which can be performed by one or more systems to identify an aged circuit in accordance with one or more embodiments described herein.

FIG. 3A illustrates a diagram of an example, non-limiting first comparison 300 that can be generated by the analysis component 114 in accordance with one or more embodiments described herein. Repetitive description of like elements employed in other embodiments described herein is omitted for sake of brevity. As shown in FIG. 3A the first line 302 can be the I-V curve generated by the curve component 112 and/or entered by the one or more input devices 106. The second line 304 can be a reference I-V curve retrieved from the reference archive 122 and/or entered by the one or more input devices 106. The bold lined circle depicted in FIG. 3A can delineate the transition knee of the I-V curve and/or the reference transition knee of the reference I-V curve. Further, the bold arrow in FIG. 3A can delineate a difference between the I-V curve and the reference I-V curve determined by the analysis component 114, wherein the difference can be indicative of a distortion of the sub-threshold IDDQ signature of the subject test circuit 107.

For example, an AC-type constant voltage stress can cause a uniform degradation (e.g., a bias temperature instability degradation) of the sub-threshold IDDQ signature of a subject test circuit 107. Further, the uniform degradation can be depicted by a reduction in the current amplitude of the I-V curve regarding the subject test circuit 107 as compared to a reference I-V curve. In particular, a current amplitude of the I-V curve can become progressively reduced with increased stress (e.g., AC-type constant voltage stress) experienced by the subject test circuit 107. Additionally, a rate of current increase of the first main slope of the I-V curve (e.g., the main slope at voltages below the transition knee) can be reduced as compared to a rate of increase of the first main slope of the reference I-V curve. However, despite the reduced current amplitude and/or rate of current increase in the first main slope, the shape and/or voltage position of the transition knee of the I-V curve can remain relatively unchanged as compared with the shape and/or voltage position of the reference transition knee of the reference I-V curve. For instance, FIG. 3A depicts a comparison that can be generated by the analysis component 114 regarding a test circuit 107 that has experienced aging caused by a uniform degradation and/or delineated by a distortion of the test circuit's 107 sub-threshold IDDQ signature as evidenced by a reduction in the current amplitude and/or a reduction in the slope (e.g., reduction in the rate of current increase) of an I-V curve characterizing the test circuit 107 when compared to a reference I-V curve of a non-aged circuit.

Figure 3B:
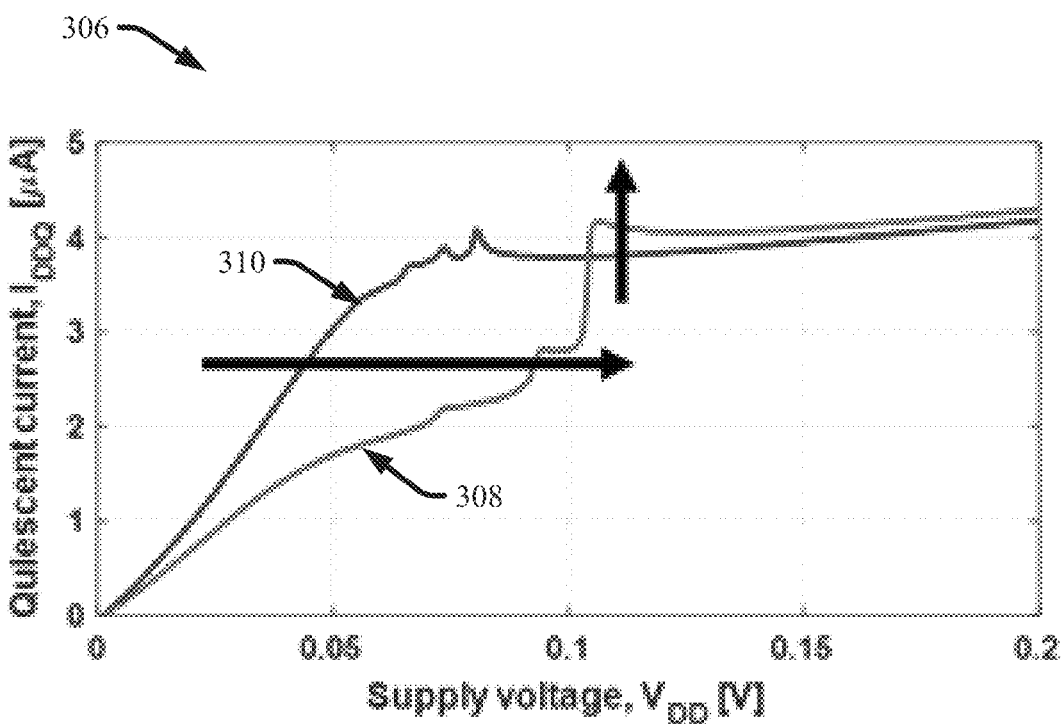
FIG. 3B illustrates a diagram of an example, non-limiting comparison of a measured current-voltage characteristic curve and a reference current-voltage characteristic curve, which can be performed by one or more systems to identify an aged circuit in accordance with one or more embodiments described herein.

FIG. 3B illustrates a diagram of an example, non-limiting second comparison 306 that can be generated by the analysis component 114 in accordance with one or more embodiments described herein. Repetitive description of like elements employed in other embodiments described herein is omitted for sake of brevity. As shown in FIG. 3B the third line 308 can be the I-V curve generated by the curve component 112 and/or entered by the one or more input devices 106. The fourth line 310 can be a reference I-V curve retrieved from the reference archive 122 and/or entered by the one or more input devices 106. Further, the bold arrows in FIG. 3B can delineate one or more differences between the I-V curve and the reference I-V curve determined by the analysis component 114, wherein the one or more differences can be indicative of a distortion of the sub-threshold IDDQ signature of the subject test circuit 107.

For example, a DC-type constant voltage stress can cause a non-uniform degradation of the sub-threshold IDDQ signature of a subject test circuit 107. Further, the non-uniform degradation can be depicted by multiple differences between the I-V curve regarding the sub-threshold IDDQ signature and the reference I-V curve. For instance, the one or more of the differences can include the following. The rate of current increase in the first main slope of the I-V curve can be lower than the rate of current increase in the first main slope of the reference I-V curve. Additionally, the transition knee of the I-V curve can be characterized by a sudden increase of the current and an "overshoot" of the peak, as compared to a relatively smooth reference transition knee of the reference I-V curve. Moreover, the voltage position of the transition knee of the I-V curve can be located at a higher voltage than the voltage position of the reference transition knee of the reference I-V curve. For instance, FIG. 3B depicts a comparison that can be generated by the analysis component 114 regarding a test circuit 107 that has experienced aging caused by a non-uniform degradation and/or delineated by a distortion of the test circuit's 107 sub-threshold IDDQ signature as evidenced by: a current overshoot peak in the I-V curve formed at about 100 mV as compared with the reference I-V curve, a shallower rate of current increase in the first main slope of the I-V curve as compared to the rate of current increase in the first main slope of the reference I-V curve, and/or a voltage position of the transition knee in the I-V curve occurring at about 100 mV whereas the voltage position of the reference transition knee in the reference I-V curve occurring at about 60 mV.

Thus, in various embodiments the analysis component 114 can identify one or more distortions in the sub-threshold IDDQ signature of a subject test circuit 107 based on a comparison of an I-V curve characterizing the test circuit 107 with a reference I-V curve. One or more differences between the measured I-V curve and the reference I-V curve can delineate the presence of one or more distortions. The one or more distortions can be a result of one or more types of degradation caused by stress, and/or can thereby be an indication that the subject test circuit 107 is an aged circuit. Further, the types of differences between the measured I-V curve and the reference I-V curve can be an indication of the type of degradation experienced by the aged circuit. Advantageously, the various features of the analysis component 114 described herein (e.g., identifying one or more sub-threshold IDDQ distortions base on one or more reference I-V curves) can be performed without destroying the subject test circuit 107 and/or without detailed knowledge of the test circuit's 107 operation.

Figure 4:
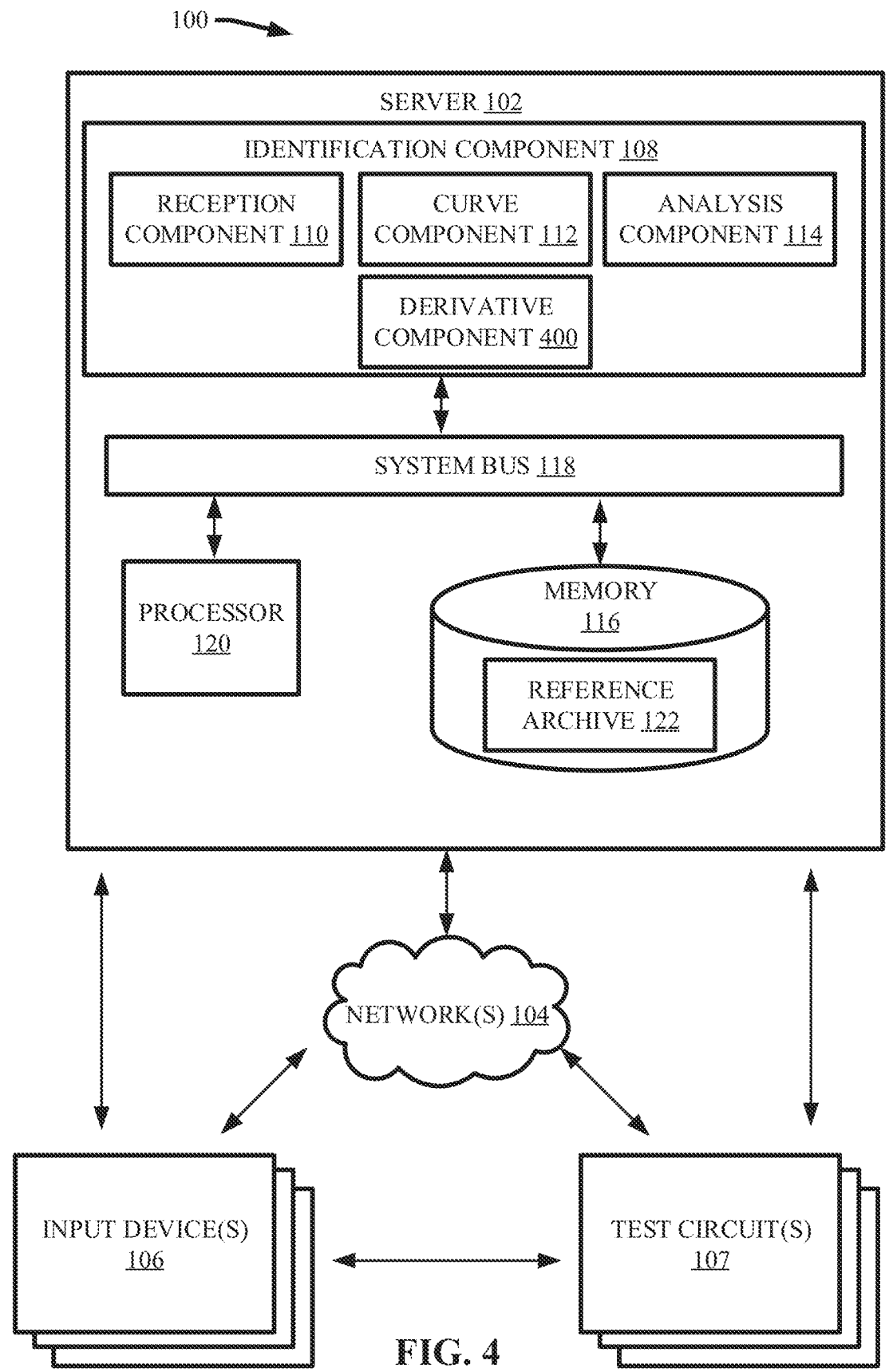
FIG. 4 illustrates a block diagram of an example, non-limiting system that can identify one or more aged circuits based on a sub-threshold quiescent current signature in accordance with one or more embodiments described herein.

FIG. 4 illustrates a diagram of the example, non-limiting system 100 further comprising a derivative component 400 in accordance with one or more embodiments described herein. Repetitive description of like elements employed in other embodiments described herein is omitted for sake of brevity. In one or more embodiments, the derivative component 400 can generate one or more derivatives of a measured I-V curve (e.g., generated by the curve component 112 and/or entered by the one or more input devices 106) to facilitate identification of an aged circuit.

In various embodiments, the derivative component 400 can generate one or more derivatives of a subject I-V curve. For example, the derivative component 400 can generate a first order derivative of a subject I-V curve. Additionally, the derivative component 400 can generate one or more derivatives of various orders. For example, the derivative component 400 can generate a second order derivative of a subject I-V curve. The one or more derivative I-V curves (e.g., first order derivative of a subject I-V curve) can be analyzed by the analysis component 114 to identifying one or more distortions in a test circuit's 107 sub-threshold IDDQ signature without comparison with a reference I-V curve.

Figure 5:
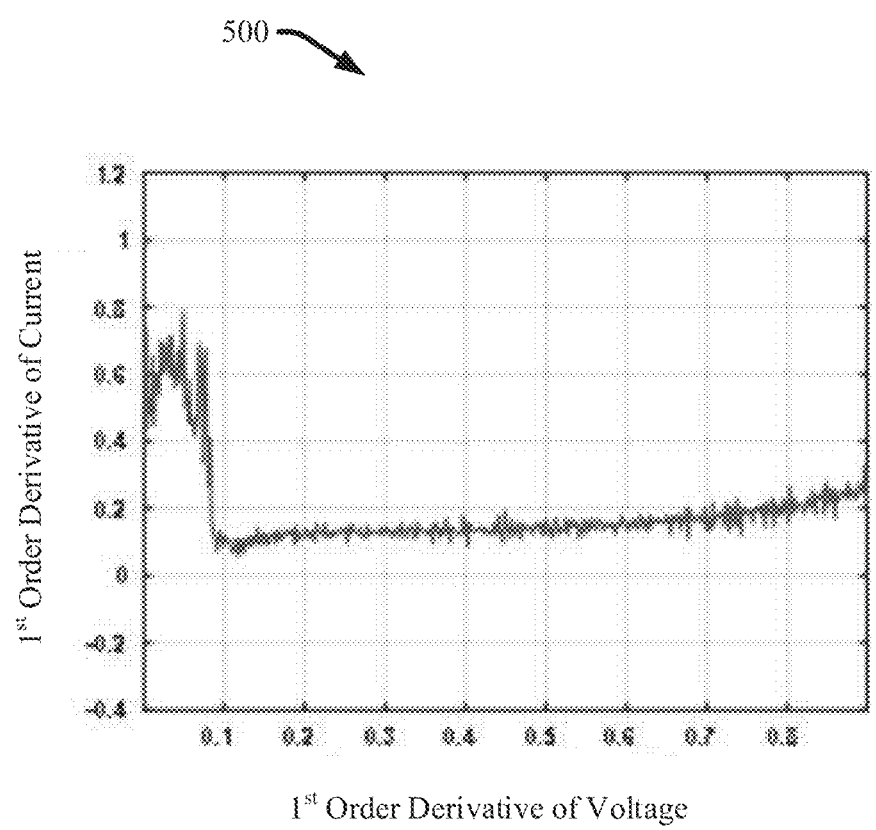
FIG. 5 illustrates a diagram of an example, non-limiting derivative of a measured current-voltage characteristic curve that a system can generate to facilitate identification of an aged circuit in accordance with one or more embodiments described herein.

FIG. 5 illustrates a diagram of an example, non-limiting first derivative 500 of an I-V curve characterizing a test circuit 107 subject to analysis by the identification component 108 (e.g., via the analysis component 114) in accordance with one or more embodiments described herein. Repetitive description of like elements employed in other embodiments described herein is omitted for sake of brevity. The first derivative 500 can be a first order derivative generated by the derivative component 400.

The first derivative 500 of an I-V curve depicted in FIG. 5 can be generated by the derivative component 400 and/or can characterize a non-aged circuit. A derivative of an I-V curve can comprise two main levels corresponding to the two main slopes of the I-V curve. For example, a first level of the derivative of the I-V curve can correspond to the first main slope of the I-V curve and can be higher than a second level of the derivative of the I-V curve that can correspond to the second main slope of the I-V curve.

Figure 6:
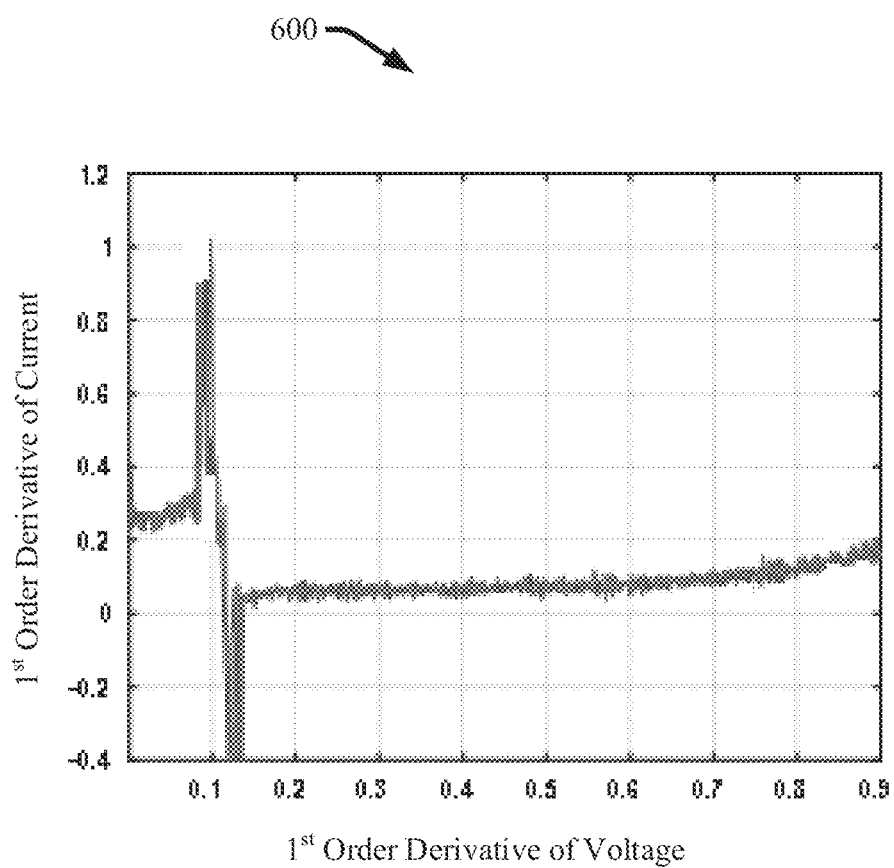
FIG. 6 illustrates a diagram of an example, non-limiting derivative of a measured current-voltage characteristic curve that a system can generate to facilitate identification of an aged circuit in accordance with one or more embodiments described herein.

FIG. 6 illustrates a diagram of an example, non-limiting second derivative 600 of an I-V curve characterizing a test circuit 107 subject to analysis by the identification component 108 (e.g., via the analysis component 114) in accordance with one or more embodiments described herein. Repetitive description of like elements employed in other embodiments described herein is omitted for sake of brevity. The second derivative 600 can be a first order derivative generated by the derivative component 400.

The second derivative 600 of an I-V curve depicted in FIG. 6 can be generated by the derivative component 400 and/or can characterize an aged circuit. One or more distortions to a test circuit's 107 sub-threshold IDDQ signature can be depicted in the derivative of the I-V curve by one or more of the following example characteristics. A first characteristic can be that a step transition in the derivative between the high level and the low level can be at a position along the x-axis of the derivative of the I-V curve that is greater than a defined position threshold. The position threshold can vary depending on the type of test circuit 107 subject to analysis by the identification component 108. For example, features such as the threshold of a transistor comprised within the test circuit 107 and/or the total current of the test circuit 107 can influence the position threshold. The position threshold can be, for example, greater than or equal to 0 and less than or equal to 1 along the x-axis of the derivative of the I-V curve. A second characteristic can be that peaks of the step transition between levels in the derivative can exceed a defined first peak threshold and/or a defined second peak threshold along the y-axis of the derivative of the I-V curve; thereby generating one or more overshoot peaks and/or undershoot peaks in the derivative of the I-V curve. For example, features such as changes in one or more characteristics of consecutive gates of the test circuit 107 can influence the peak thresholds.

Further, in various embodiments the position of the first zero crossing of a second order derivative of the sub-threshold IDDQ signature can be used to identify the position of the transition knee. For example, aged/used circuit can be identified by determining that the position of the first zero crossing is higher than a defined threshold, which can be determined by examining known un-aged circuits of similar type and/or by considering normal random variability the test circuits 107.

In various embodiments, the defined thresholds (e.g., the position threshold, the first peak threshold, and the second peak threshold) can be entered into the system 100 by the one or more input devices 106 (e.g., the thresholds can be defined by a user of the system 100) and/or stored in the reference archive 122.

The analysis component 114 can analyze the one or more derivative I-V curves generated by the derivative component 400 to identify one or more distortions in a test circuit's 107 sub-threshold IDDQ signature based on whether one or more features of the derivative I-V curve exceed one or more of the defined thresholds. For example, wherein the position threshold is 0.1 along the x-axis of the derivative of the I-V curve, the first peak threshold is 0.80 along the y-axis of the derivative of the I-V curve, and/or the second peak threshold is 0 along the y-axis of the derivative of the I-V curve, the analysis component 114 can determine that the first derivative 500 depicted in FIG. 5 characterizes an un-aged circuit at least because various features of the first derivative 500 do not exceed the defined thresholds. For instance, a step transition of the first derivative 500 occurs at a position along the x-axis that is less than the position threshold of 0.1. Also, a first peak (e.g., a peak at the end of the first level) of the step transition in the first derivative 500 extends to a value along the y-axis that is less than or equal to the first peak threshold of 0.8. Moreover, a second peak (e.g., a peak at the start of the second level) of the step transition in the first derivative 500 extends along the y-axis to a value that is short of the second peak threshold of 0.

In contrast, the analysis component 114 can determine that the second derivative 600 depicted in FIG. 6 characterizes an aged circuit at least because various features of the second derivative 600 exceed one or more of the defined thresholds. For instance, a step transition of the second derivative 600 occurs at a position along the x-axis that is greater than the position threshold of 0.1. Also, a first peak of the step transition in the second derivative 600 extends along the y-axis to an amplitude greater than the first peak threshold of 0.80. Moreover, a second peak of the step transition in the second derivative 600 extends along the y-axis beyond the second peak threshold of 0.

Thus, in various embodiments the analysis component 114 can identify one or more distortions in the sub-threshold IDDQ signature of a subject test circuit 107 based on a comparison of a derivative I-V curve characterizing the test circuit 107 with one or more predefined thresholds (e.g., a position threshold, a first peak threshold, and/or a second peak threshold). One or more violations of the predefined thresholds can delineate the presence of one or more distortions. The one or more distortions can be a result of one or more types of degradation caused by stress, and/or can thereby be an indication that the subject test circuit 107 is an aged circuit. Advantageously, the various features of the analysis component 114 described herein (e.g., identifying one or more sub-threshold IDDQ distortions base on one or more defined thresholds regarding derivative I-V curves) can be performed without the need for one or more reference I-V curves.

Figure 7:
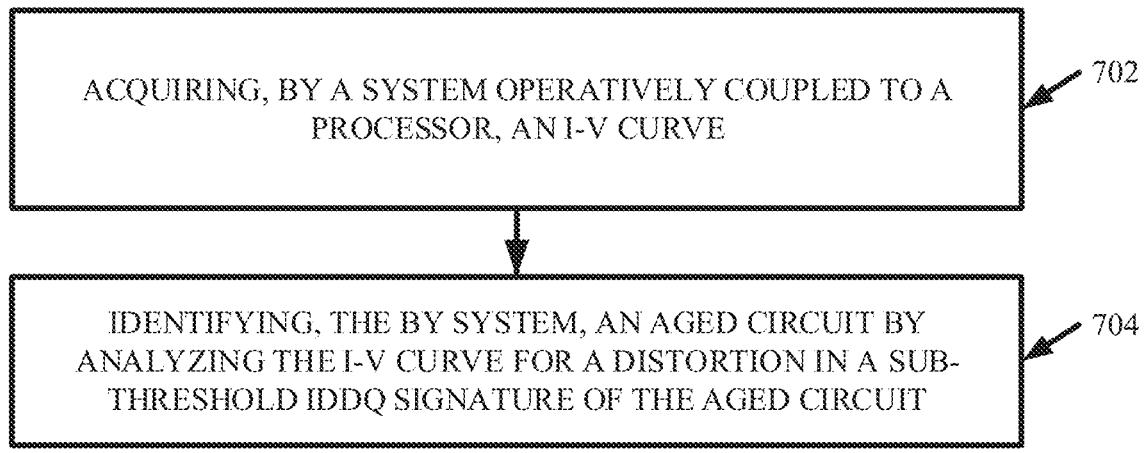
FIG. 7 illustrates a flow diagram of an example, non-limiting method that can facilitate autonomous identification of an aged circuit based on a sub-threshold quiescent current signature in accordance with one or more embodiments described herein.

FIG. 7 illustrates a flow diagram of an example, non-limiting method 700 that can facilitate autonomous identification of one or more aged circuits based on sub-threshold IDDQ signatures in accordance with one or more embodiments described herein. Repetitive description of like elements employed in other embodiments described herein is omitted for sake of brevity.

At 702, the method 700 can comprise acquiring, by a system 100 operatively coupled to a processor 120, one or more I-V curves. In one or more embodiments, the one or more I-V curves can regard one or more test circuits 107 and/or can be entered into the system 100 via the one or more input devices 106 and/or shared with the one or more servers 102 directly (e.g., via an electrical connection) and/or indirectly (e.g., via the one or more networks 104). In various embodiments, the one or more I-V curves can be generated by the curve component 112, which can generate the curves based on performance data of one or more test circuits 107. The performance data can be entered into the system 100 by a user via the one or more input devices 106 and/or can be generated and/or shared by the one or more test circuits 107. The one or more I-V curves can include a region corresponding to a sub-threshold IDDQ signature of the test circuits 107 subject to analysis by the system 100.

At 704, the method 700 can comprise identifying, by the system 100 (e.g., via the analysis component 114), an aged circuit by analyzing the one or more acquired I-V curves for one or more distortions in the sub-threshold IDDQ signature of the aged circuit. For example, the identifying at 704 can comprise comparing (e.g., by the analysis component 114) the one or more I-V curves with one or more reference I-V curves, wherein differences between the one or more I-V curves and the one or more reference I-V curves can delineate distortions in the sub-threshold IDDQ signature and/or indicate that a test circuit 107 is an aged circuit in accordance with the various embodiments described herein. In another example, the identifying at 704 can comprise comparing (e.g., by the analysis component 114) one or more derivatives (e.g., generated by the derivative component 400) of the one or more I-V curves with one or more defined thresholds (e.g., a position threshold, a first peak threshold, a second peak threshold), wherein violations of the one or more defined thresholds can delineate distortions in the sub-threshold IDDQ signature and/or indicate that a test circuit 107 is an aged circuit in accordance with various embodiments described herein.

Figure 8:
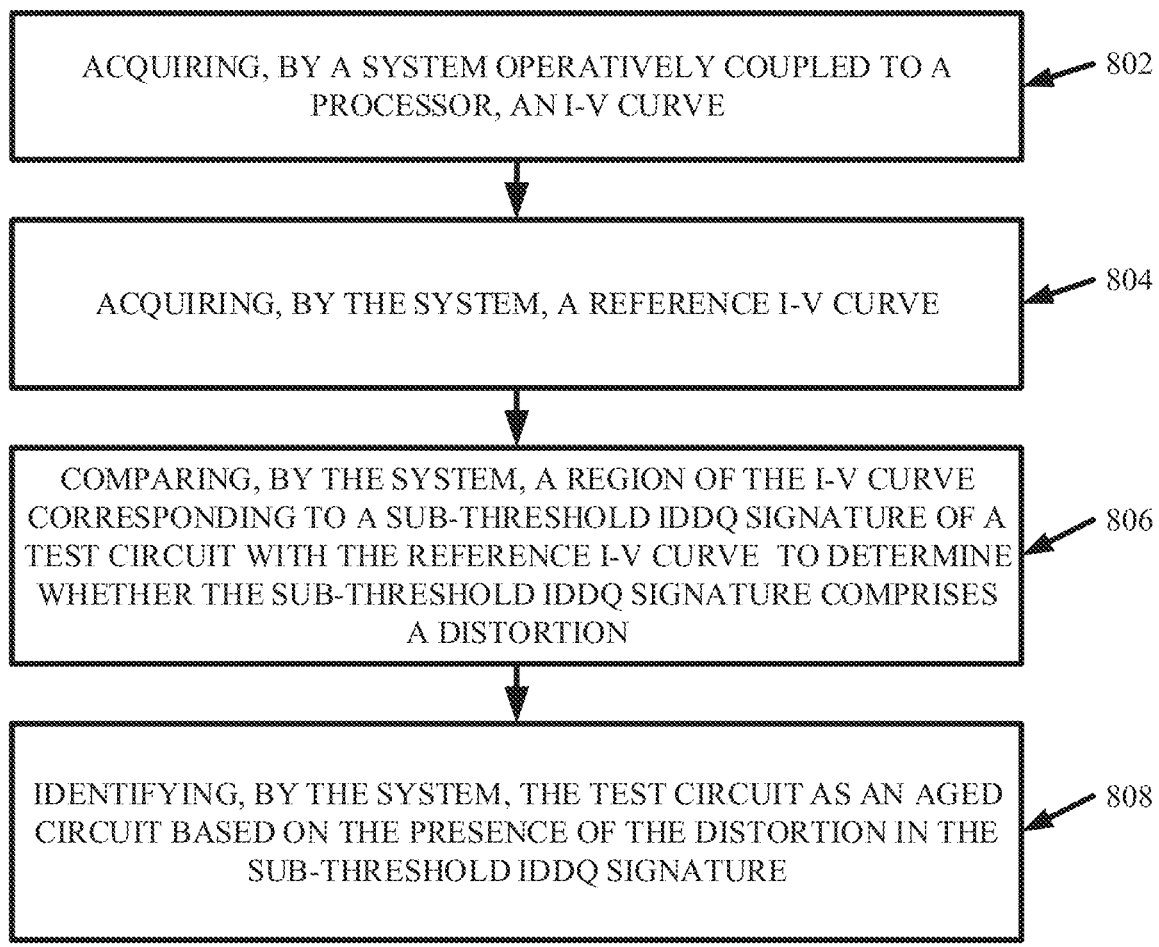
FIG. 8 illustrates a flow diagram of an example, non-limiting method that can facilitate autonomous identification of an aged circuit based on a sub-threshold quiescent current signature in accordance with one or more embodiments described herein.

FIG. 8 illustrates a flow diagram of an example, non-limiting method 800 that can facilitate autonomous identification of one or more aged circuits based on sub-threshold IDDQ signatures in accordance with one or more embodiments described herein. Repetitive description of like elements employed in other embodiments described herein is omitted for sake of brevity.

At 802, the method 800 can comprise acquiring, by a system 100 operatively coupled to a processor 120, one or more I-V curves. In one or more embodiments, the one or more I-V curves can regard one or more test circuits 107 and/or can be entered into the system 100 via the one or more input devices 106 and/or shared with the one or more servers 102 directly (e.g., via an electrical connection) and/or indirectly (e.g., via the one or more networks 104). In various embodiments, the one or more I-V curves can be generated by the curve component 112, which can generate the curves based on performance data of one or more test circuits 107. The performance data can be entered into the system 100 by a user via the one or more input devices 106 and/or can be generated and/or shared by the one or more test circuits 107. The one or more I-V curves can include a region corresponding to a sub-threshold IDDQ signature of the test circuits 107 subject to analysis by the system 100.

At 804, the method 800 can comprise acquiring, by the system 100, one or more reference I-V curves. The one or more reference I-V curves can be entered into the system 100 via the one or more input devices 106 and/or can be stored in the reference archive 122. In various embodiments, the one or more reference I-V curves can characterize un-aged circuits. For example, the one or more reference I-V curves can characterize circuits that have not been subject to degradation (e.g., degradation induced by stress such as ramp voltage stress and/or constant voltage stress).

At 806, the method 800 can comprise comparing, by the system 100 (e.g., via the analysis component 114), a region of the one or more I-V curves corresponding a sub-threshold IDDQ signature of the one or more test circuits 107 with the one or more reference I-V curves to determine whether the sub-threshold IDDQ signature comprises one or more distortions. As described herein, the one or more distortions can be depicted by differences between the one or more measured I-V curves acquired at 802 and the one or more reference I-V curves acquired at 804. Example differences can include, but are not limited to: different current amplitudes, different rates of current increase, different voltage positions of transition knees, different shapes of transition knees, the presence of one or more exaggerated peaks, a combination thereof, and/or the like.

At 808, the method 800 can comprise identifying, by the system 100 (e.g., via the analysis component 114), the test circuit 107 as an aged circuit based on the presence of one or more distortions in the sub-threshold IDDQ signature characterized by the one or more I-V curves. Distortions in the sub-threshold IDDQ signature can be delineated by one or more differences identified by the comparing at 806. Further, the distortions can indicate that the test circuit 107 subject to analysis (e.g., by the identification component 108) has been subject to one or more forms of stress and thereby is an aged circuit.

Figure 9:
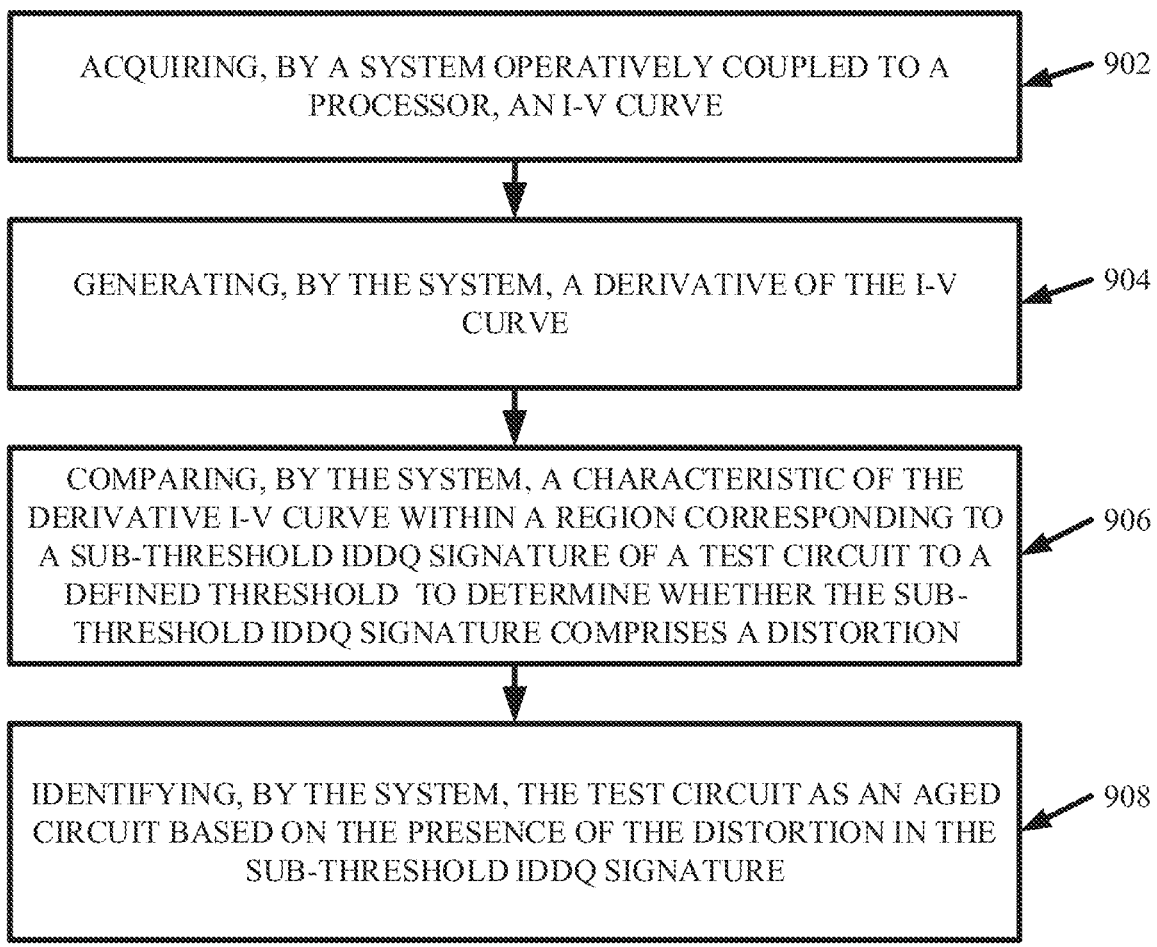
FIG. 9 illustrates a flow diagram of an example, non-limiting method that can facilitate autonomous identification of an aged circuit based on a sub-threshold quiescent current signature in accordance with one or more embodiments described herein.

FIG. 9 illustrates a flow diagram of an example, non-limiting method 900 that can facilitate autonomous identification of one or more aged circuits based on sub-threshold IDDQ signatures in accordance with one or more embodiments described herein. Repetitive description of like elements employed in other embodiments described herein is omitted for sake of brevity.

At 902, the method 900 can comprise acquiring, by a system 100 operatively coupled to a processor 120, one or more I-V curves. In one or more embodiments, the one or more I-V curves can regard one or more test circuits 107 and/or can be entered into the system 100 via the one or more input devices 106 and/or shared with the one or more servers 102 directly (e.g., via an electrical connection) and/or indirectly (e.g., via the one or more networks 104). In various embodiments, the one or more I-V curves can be generated by the curve component 112, which can generate the curves based on performance data of one or more test circuits 107. The performance data can be entered into the system 100 by a user via the one or more input devices 106 and/or can be generated and/or shared by the one or more test circuits 107. The one or more I-V curves can include a region corresponding to a sub-threshold IDDQ signature of the test circuits 107 subject to analysis by the system 100.

At 904, the method 900 can comprise generating, by the system 100 (e.g., via the derivative component 400), one or more derivatives of the one or more I-V curves acquired at 902. The one or more derivatives generated (e.g., via the derivative component 400) at 904 can be of various orders. For example, the one or more derivatives generated (e.g., via the derivative component 400) at 904 can be first order derivatives of the one or more I-V curves. The one or more derivative I-V curves can comprise two levels along the y-axis connected by a step transition. A first level can correspond to a first main slope of the I-V curve and can be current measure that is higher than a second level corresponding to a second main slope of the I-V curve.

At 906, the method 900 can comprise comparing, by the system 100 (e.g., via the analysis component 114), one or more characteristics of the one or more derivative I-V curves within a region corresponding to a sub-threshold IDDQ signature of a test circuit 107 to one or more defined thresholds to determine whether the sub-threshold IDDQ signature comprises one or more distortions. For example, the one or more characteristics compared at 900 can include, but are not limited to: the position of the step transition included in the one or more derivative I-V curves, the amplitude of a first peak of the step transition included in the one or more derivative I-V curves, the amplitude of a second peak of the step transition included in the one or more derivative I-V curves, a combination thereof, and/or the like. For instance, the one or more defined thresholds can include position thresholds, first peak thresholds, and/or second peak thresholds that describe non-distorted characteristics of the one or more derivative I-V curves. Violation of the one or more defined thresholds (e.g., a position of the step transition along the x-axis of the derivative of the I-V curve that exceeds the position threshold) can be indicative of one or more distortions in the sub-threshold IDDQ signature.

At 908, the method 900 can comprise identifying, by the system 100 (e.g., via the analysis component 114), the test circuit 107 as an aged circuit based on the presence of one or more distortions in the sub-threshold IDDQ signature characterized by the one or more derivative I-V curves. Distortions in the sub-threshold IDDQ signature can be delineated by one or more threshold violations identified by the comparing at 906. Further, the distortions can indicate that the test circuit 107 subject to analysis (e.g., by the identification component 108) has been subject to one or more forms of stress and thereby is an aged circuit.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
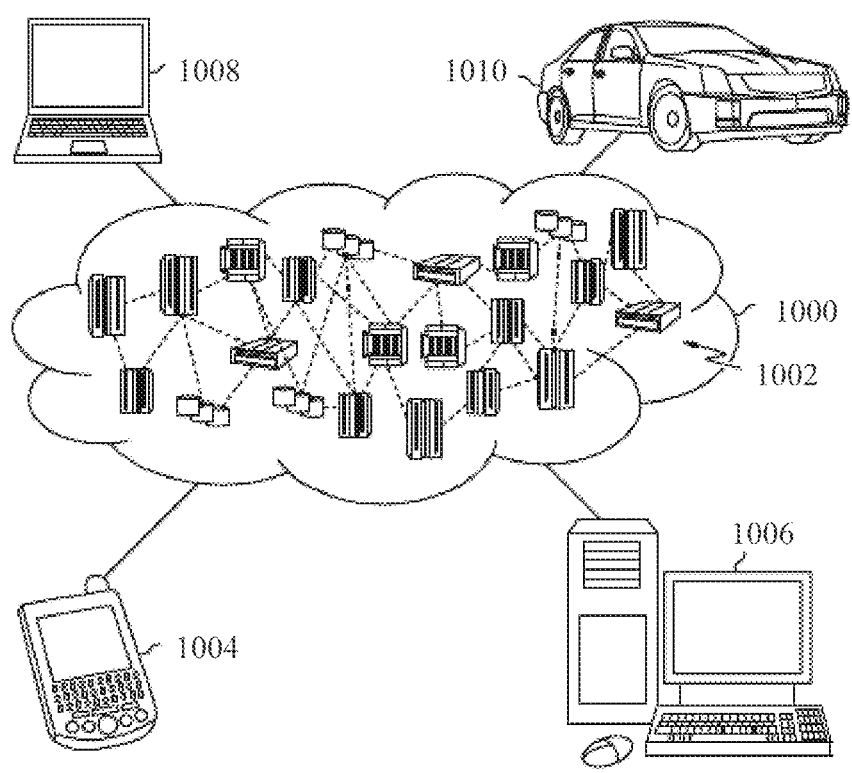
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
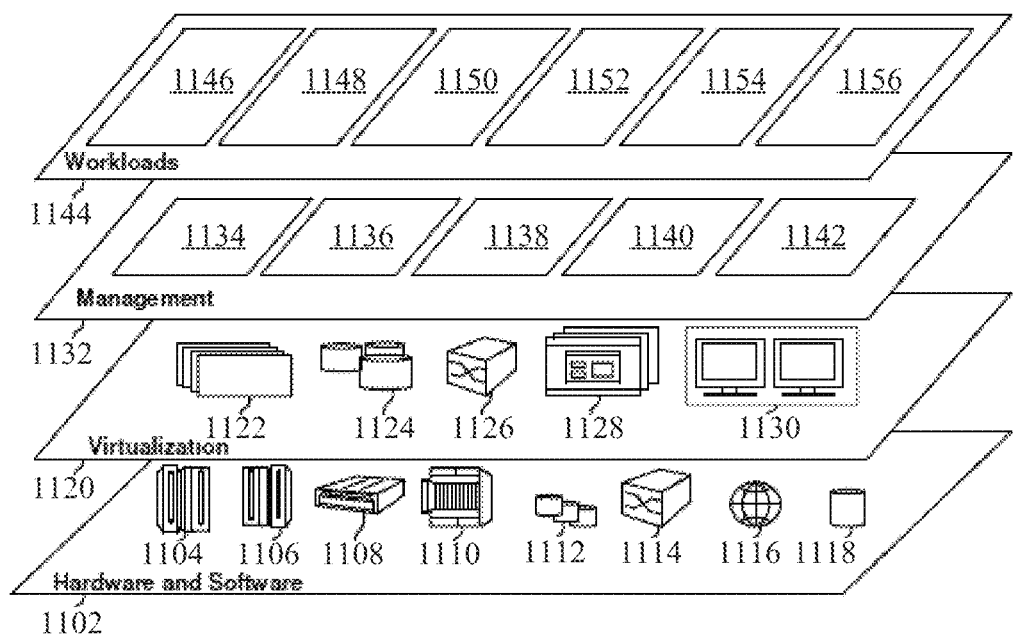
FIG. 11 depicts abstraction model layers in accordance with one or more embodiments described herein

Referring now to FIG. 11, a set of functional abstraction layers provided by cloud computing environment 1000 (FIG. 10) is shown. Repetitive description of like elements employed in other embodiments described herein is omitted for sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and aged circuit identification 1156. Various embodiments of the present invention can utilize the cloud computing environment described with reference to FIGS. 10 and 11 to facilitate in the autonomous identification of one or more aged circuits.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
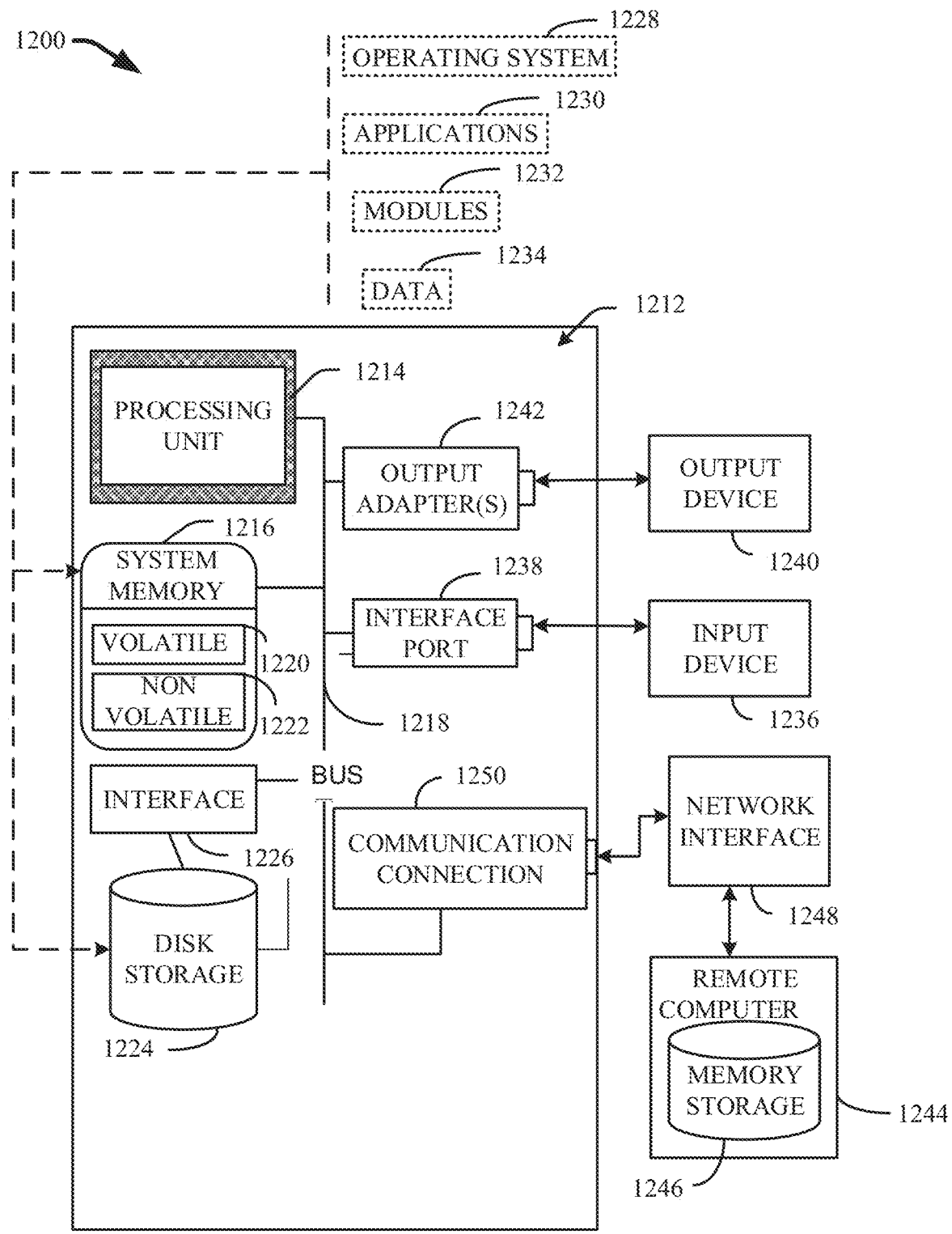
FIG. 12 illustrates a block diagram of an example, non-limiting operating environment in which one or more embodiments described herein can be facilitated.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity. With reference to FIG. 12, a suitable operating environment 1200 for implementing various aspects of this disclosure can include a computer 1212. The computer 1212 can also include a processing unit 1214, a system memory 1216, and a system bus 1218. The system bus 1218 can operably couple system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1216 can also include volatile memory 1220 and nonvolatile memory 1222. The basic input/output system (BIOS), containing the basic routines to transfer information between elements within the computer 1212, such as during start-up, can be stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 can also include removable/non-removable, volatile/non-volatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface can be used, such as interface 1226. FIG. 12 also depicts software that can act as an intermediary between users and the basic computer resources described in the suitable operating environment 1200. Such software can also include, for example, an operating system 1228. Operating system 1228, which can be stored on disk storage 1224, acts to control and allocate resources of the computer 1212. System applications 1230 can take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through one or more input devices 1236. Input devices 1236 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1214 through the system bus 1218 via one or more interface ports 1238. The one or more Interface ports 1238 can include, for example, a serial port, a parallel port, a game port, and a universal serial bus (USB). One or more output devices 1240 can use some of the same type of ports as input device 1236. Thus, for example, a USB port can be used to provide input to computer 1212, and to output information from computer 1212 to an output device 1240. Output adapter 1242 can be provided to illustrate that there are some output devices 1240 like monitors, speakers, and printers, among other output devices 1240, which require special adapters. The output adapters 1242 can include, by way of illustration and not limitation, video and sound cards that provide a means of connection between the output device 1240 and the system bus 1218. It should be noted that other devices and/or systems of devices provide both input and output capabilities such as one or more remote computers 1244.

Computer 1212 can operate in a networked environment using logical connections to one or more remote computers, such as remote computer 1244. The remote computer 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer 1244. Remote computer 1244 can be logically connected to computer 1212 through a network interface 1248 and then physically connected via communication connection 1250. Further, operation can be distributed across multiple (local and remote) systems. Network interface 1248 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor, operably coupled to the memory, and that executes the computer executable components stored in the memory, wherein the computer executable components comprise:
      an identification component, operatively coupled to the processor and to one or more test circuits, that:
         analyzes the one or more test circuits operated at sub-threshold voltages;
         generates a current-voltage characteristic curve characterizing the operation of the one or more test circuits, wherein a test circuit of the one or more test circuits is an integrated circuit and wherein generation of the current-voltage characteristic curve is resultant from receiving data, at the identification component, via receipt of an electrical signal in the test circuit; and
         identifies whether at least one of the one or more test circuits is an aged circuit by analyzing a current-voltage characteristic curve for a distortion in a sub-threshold quiescent current signature of the aged circuit, and wherein the distortion is characterized by the formation of multiple peaks in the sub-threshold current measurement of the current-voltage characteristic curve;
      a display physically coupled to the identification component and that:
         generates, via a screen of the display, an electronic visual indicator of a location of the distortion on the current-voltage characteristic curve, wherein the electronic visual indicator is generated by the display and output, via the screen of the display, to a user of the system; and
         identifies the one or more test circuits as an aged circuit without destructive inspection methods, wherein the aged circuit is determined to be a counterfeit or otherwise unacceptable circuit.

2. The system of claim 1, wherein the identification component comprises:
   an analysis component, operatively coupled to the processor, that analyzes a region of the current-voltage characteristic curve comprising a transition knee between two different slopes of the current-voltage characteristic curves;
   a reception component physically coupleable to a wire of the one or more test circuits and that receives, over one or more Internet networks, from a wired or wireless network, data regarding the one or more test circuits.

3. The system of claim 2, wherein the analysis component compares the region of the current-voltage characteristic curve with a reference current-voltage characteristic curve to determine whether the sub-threshold quiescent current signature comprises the distortion.

4. The system of claim 3, wherein the reference current-voltage characteristic curve comprises a reference transition knee between two different reference slopes of the reference current-voltage characteristic curve.

5. The system of claim 3, wherein the distortion is characterized by a variation between the current-voltage characteristic curve and the reference current-voltage characteristic curve.

6. The system of claim 1, wherein the identification component further comprises:
   a derivative component, operatively coupled to the processor, that generates a derivative of the current-voltage characteristic curve; and
   an analysis component, operatively coupled to the processor, that analyzes a region of the derivative of the current-voltage characteristic curve corresponding to the sub-threshold quiescent current signature of the aged circuit.

7. The system of claim 6, wherein the analysis component compares a characteristic of the derivative of the current-voltage characteristic curve within the region with a defined threshold to determine whether the sub-threshold quiescent current signature comprises the distortion.

8. The system of claim 7, wherein the derivative is a first order derivative.

9. The system of claim 7, wherein the analysis component determines that the sub-threshold quiescent current signature comprises the distortion based on an amplitude of the derivative of the current-voltage characteristic curve varying from the defined threshold.

10. The system of claim 7, wherein the analysis component determines that the sub-threshold quiescent current signature comprises the distortion based on a position of a peak of the derivative of the current-voltage characteristic curve varying from the defined threshold.

11. The system of claim 1, wherein the distortion is caused by a stress induced on the aged circuit, and wherein the stress is selected from a group consisting of a ramp voltage stress, a constant voltage stress, a high humidity stress and an elevated temperature stress.

12. A computer-implemented method, comprising:
   analyzing, by a system operatively coupled to a processor and to one or more test circuits, the one or more test circuits operated at sub-threshold voltages, wherein the system that performs the analyzing comprises an electrical device configured to assess the electrical characteristics of the one or more test circuits;
   generating, by the system, a current-voltage characteristic curve characterizing the operation of the one or more test circuits;
   identifying, by the system, whether at least one of the one or more test circuits is an aged circuit by analyzing a current-voltage characteristic curve for a distortion in a sub-threshold quiescent current signature of the aged circuit, wherein the distortion is characterized by the formation of multiple peaks in the sub-threshold current measurement of the current-voltage characteristic curve;
   generating, by a screen of a display connected to the system, a visual indicator of a location of the distortion on the current-voltage characteristic curve, wherein the visual indicator is generated by the display and output, via the screen of the display, to a user of the system;
   transmitting, by the system, to one or more devices, from the system, via an electrical connection of one or more servers, data received at the system and employed to perform the identifying; and identifying, by the system, the one or more test circuits as an aged circuit without reverse engineering and based on the current-voltage characteristic curve.

13. The computer-implemented method of claim 12, wherein the analyzing the current-voltage characteristic curve for the distortion in the sub-threshold quiescent current signature of the aged circuit is directed to a region of the current-voltage characteristic curve corresponding to the sub-threshold quiescent current signature of the aged circuit.

14. The computer-implemented method of claim 13, further comprising:
comparing, by the system, the region of the current-voltage characteristic curve with a reference current-voltage characteristic curve to determine whether the sub-threshold quiescent current signature comprises the distortion.

15. The computer-implemented method of claim 12, further comprising:
generating, by the system, a derivative of the current-voltage characteristic curve, wherein the analyzing is directed to a region of the derivative of the current-voltage characteristic curve corresponding to the sub-threshold quiescent current signature of the aged circuit.

16. The computer-implemented method of claim 15, further comprising:
comparing, by the system, a characteristic of the derivative of the current-voltage characteristic curve within the region to a defined threshold to determine whether the sub-threshold quiescent current signature comprises the distortion.

17. A computer program product for identifying an aged circuit, the computer program product comprising a computer readable storage medium having program instructions embodied therewith, the program instructions executable by a processor to cause the processor to:
identify, by a system operatively coupled to the processor, the aged circuit by analyzing a derivative of a current-voltage characteristic curve for a distortion in a sub-threshold quiescent current signature of the aged circuit.

18. The computer program product of claim 17, wherein the program instructions cause the processor to:
compare, by the system, a region of the derivative of the current-voltage characteristic curve corresponding to the sub-threshold quiescent current signature with a defined threshold.

19. The computer program product of claim 18, wherein the derivative of the current-voltage characteristic curve is a first order derivative.

20. The computer program product of claim 17, wherein the system analyzes the current-voltage characteristic curve for the distortion in a cloud computing environment.

* * * * *